UNITED STATES PATENT OFFICE.

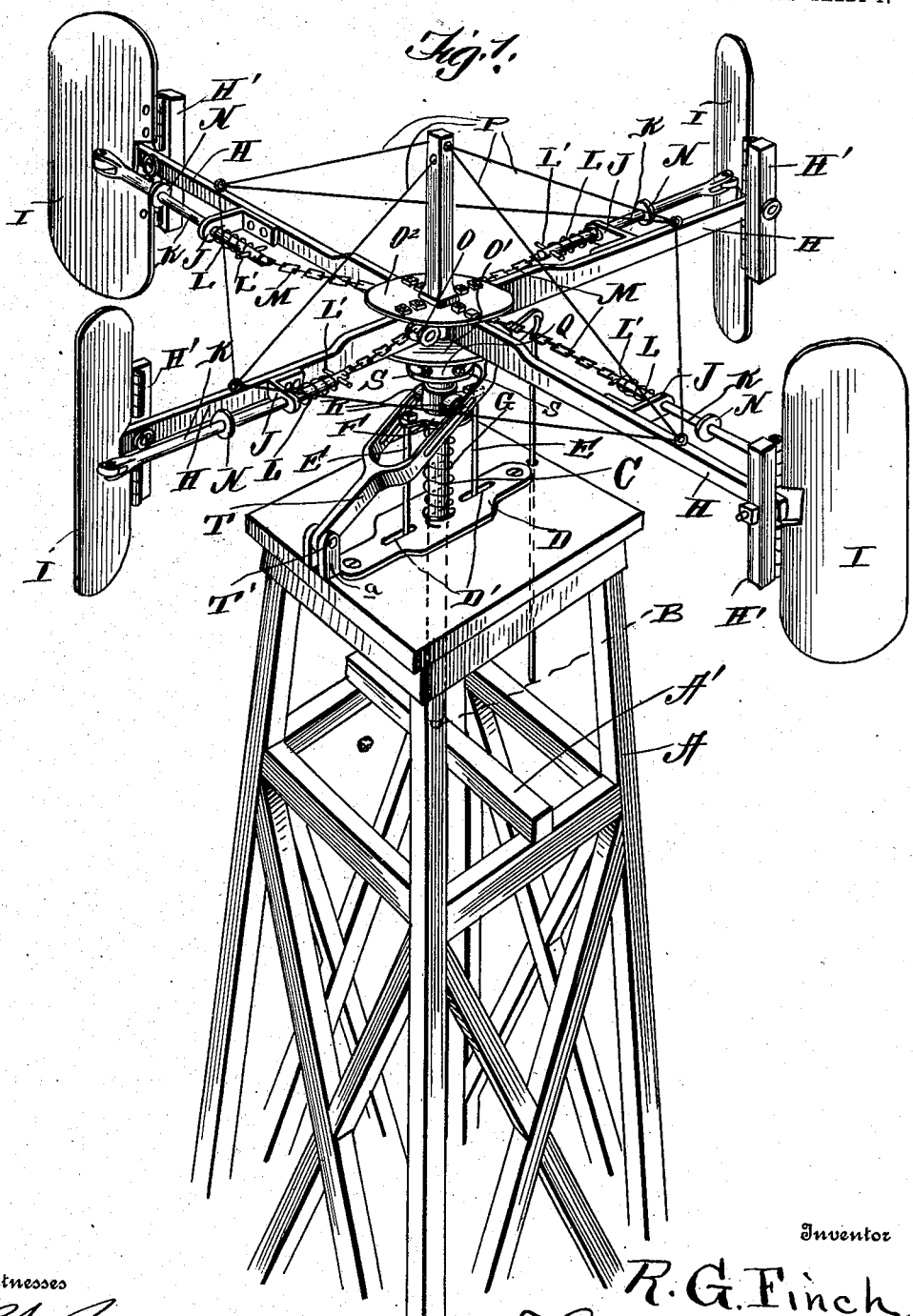

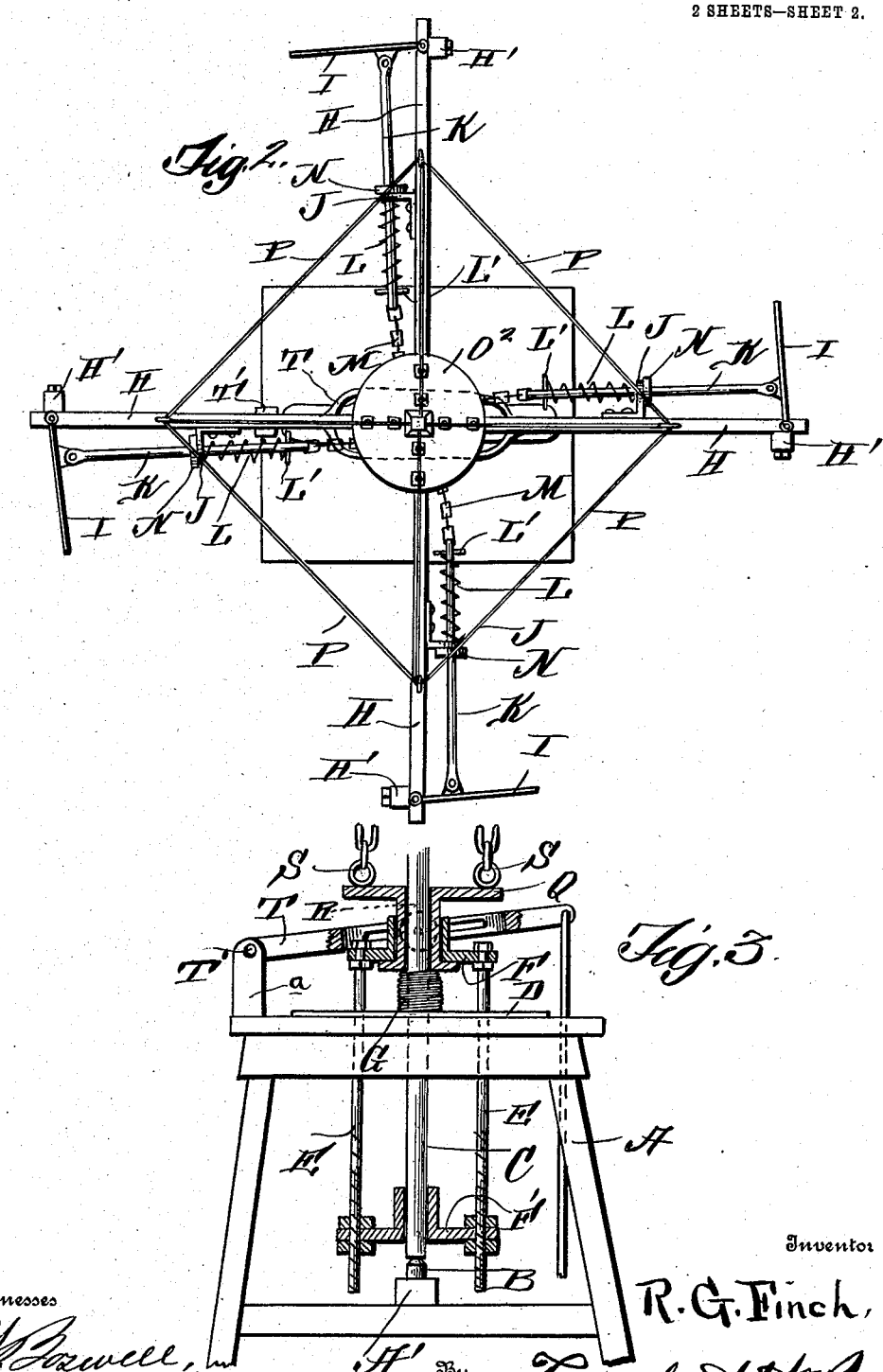

RICHARD G. FINCH, OF PLAINVILLE, KANSAS, ASSIGNOR OF ONE-HALF TO A. E. FINCH, OF PLAINVILLE, KANSAS.

WINDMILL.

No. 900,504.   Specification of Letters Patent.   Patented Oct. 6, 1908.

Application filed May 8, 1908. Serial No. 431,701.

*To all whom it may concern:*

Be it known that I, RICHARD G. FINCH, a citizen of the United States, residing at Plainville, in the county of Rooks and State of Kansas, have invented certain new and useful Improvements in Windmills; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in wind mills, the object in view being to produce a simple and efficient apparatus of this nature in which the bearings are so located as to be convenient of access and in the combination and arrangement of features which will render positive means for holding the blades in inoperative positions.

The invention is illustrated in the accompanying drawings, in which:—

Figure 1 is a perspective view of the apparatus showing the wings extended. Fig. 2 is a plan view showing the wings out of operation and so arranged as to feather the wind, and Fig. 3 is an elevation showing the means for throwing the apparatus out of gear.

Reference now being had to the details of the drawings by letter, A designates a tower having a cross-piece A' mounted at any suitable location thereon and carrying a tapering pivotal point B.

C designates a hollow shaft which is mounted with its lower end upon said pivotal point, forming a bearing therefor and passes through the platform of the tower and through a plate D mounted thereon, which plate is provided with slots D' for the reception of the rods E which are fastened at their upper ends to the apertured plate F and their lower ends to the plate F' which is similar to the plate F, both of said plates F and F' being mounted upon the shaft C. A spring G is interposed between the plate D and the plate F and serves to normally hold the latter at its highest upper limit. Fixed to said shaft and radially disposed are the arms H, four of said arms being shown in the drawings, although it will be understood that I do not limit the number of arms as a greater number may be employed if desired and the arms may be of any desired length in order to secure the desired leverage. Fixed to each end of an arm is a vertically disposed bar H', and I—I are wings which are hinged to said bar H', as shown clearly in the drawings. Projecting from each arm is an apertured finger J, and K—K designate bars which are hinged at their outer ends each to a face of a wing and extends through the aperture of said finger. A coiled spring L is mounted upon each of said rods and interposed between said finger and a pin L', the purpose of said coiled spring being to break the force of the outer swinging movement of the wing when caught by the wind and avoid unnecessary jar and rack to the parts of the apparatus.

A stop N is fixed upon each rod intermediate an apertured finger of an arm and the wing and serves to limit the inner throw of the rod and the wing to which it is pivotally connected. A chain or cord, designated by letter M, is fastened to the inner end of each rod and passes over a pulley O upon the arm and through an aperture in the disk O' which is fastened to the several arms holding the same spaced apart. A second disk $O^2$ is also fixed to said arms, the two being apertured to receive the central shaft, said disks being held in place by means of bolts or other suitable fastening means. A disk Q is mounted upon said shaft below the arms and has a flanged collar upon the shaft and bears yieldingly against the coiled spring G which is interposed between the plate upon the platform of the tower and flange at the lower end of said collar. The flange at the bottom of said collar serves to support the plate F. Eyes S are fastened to the flange at the upper end of the collar and to each of said eyes one of said chains or cords is fastened.

It will be noted that, in the rotary movement of the shaft, said flanged collar rotates therewith, the shank portion of said collar having a swivel movement within the plate F. The plates F and F' are prevented from rotation by means of the plate D through which rods pass.

In order to impart a longitudinal movement to the rods which connect the plates F and F' for the purpose of throwing the wings of the wind mill out of operative positions by the drawing down of the two plates F and F', I provide a lever T, the inner end of which is pivotally connected at T' upon a bracket arm *a*, said lever carrying two anti-friction rollers R pivotally connected thereto and adapted to bear against the plate F and a cord or chain may be attached to the end of the lever for convenience in tilting the lever. In order to brace the arms, the rods P are fastened at their inner ends to the extreme upper end of the rotatable shaft and their outer ends fastened to the arms at any suitable location as shown.

The operation of my mill will be readily understood and is as follows:—Under normal conditions, when the plates F and F' are at their highest positions, the force of the wind against the wings will cause the latter to swing out into the wind to their farthest outer limit and cause the shaft to rotate. When it is desired to throw the wings out of operative position or into positions so that they will feather the wind, by pulling down upon the lever, the disks may be drawn down against the tension of the coiled spring which bears between the plates D and F. As the plate F is drawn down, the flanged collar to which the chains are connected, and the pivotal rods are drawn downward and inwardly respectively and the wings drawn toward the rotating shaft or into feathering positions. To throw the apparatus into operative relation, the lever is released allowing the coiled spring, which bears between the plates D and F, to return the latter to its highest upper limit in which position the slack in the chains may be taken up by the wind catching the wings and causing the same to swing out to their farthest limit, the jar being taken up by the coiled springs mounted upon the inner ends of the rods which are pivoted to the wings.

What I claim to be new is:—

1. A wind mill comprising a vertically disposed rotatable shaft, a tower, a bearing for the lower end of said shaft, arms fixed to said shaft, a wing hinged to each arm, a spring-pressed flanged collar mounted upon said shaft and adapted to rotate with the latter, means for moving said collar longitudinally upon said shaft, eyes upon a flange of said collar, a rod pivotally connected to each wing, an apertured guide finger upon each arm and through which said rod passes, a collar upon each rod and designed to contact with one of said fingers to limit the movement of each rod in one direction, a spring interposed between the inner end of each rod and guide finger, a pulley upon each arm, a chain fastened at its outer end to one of said rods, passing over said pulley and connected to said flanged collar, as set forth.

2. A wind mill comprising a tower, a pivotal point mounted upon a cross-piece thereof, a vertically disposed shaft journaled upon said point, apertured plates through which said shaft passes, rods connecting said plates, a flanged collar swiveled to one of said plates and to said shaft, a spring interposed between said collar and the platform of the tower, serving to normally hold the plates at their farthest upper throw, a lever mechanism for moving said plates against the tension of said spring, a flanged collar swiveled to one of said plates and to said shaft, arms radiating from said shaft, a hinged wing mounted upon each arm, a rod pivoted to each wing, an apertured guide finger upon each arm through which said rod passes, and chain connections between said rods and flanged collar, as set forth.

In testimony whereof I hereunto affix my signature in the presence of two witnesses.

RICHARD G. FINCH.

Witnesses:
C. A. ELLIOTT,
C. W. BROWN.